April 16, 1968 W. G. BOYLE 3,378,224
WELL TOOLS
Filed June 28, 1965 2 Sheets-Sheet 1

Fig. 1

INVENTOR
William G. Boyle
BY
ATTORNEYS

INVENTOR
William G. Boyle

United States Patent Office 3,378,224
Patented Apr. 16, 1968

3,378,224
WELL TOOLS
William G. Boyle, Dallas, Tex., assignor to Otis Engineering Corporation, Dallas, Tex., a corporation of Delaware
Filed June 28, 1965, Ser. No. 467,226
17 Claims. (Cl. 251—14)

This invention relates to flow control devices and more specifically relates to a fluid pressure actuatable valve.

It is one object of the invention to provide a new and improved flow control device.

It is an important object of the invention to provide a fail-safe type safety valve remotely controllable by a fluid pressure which may function responsive to either flow dependent or non-flow dependent variables.

It is another object of the invention to provide a fail-safe type pressure operated safety valve which may be manually opened or closed.

It is a further object of the invention to provide a fail-safe type safety valve having an operator piston which is actuated in one direction by fluid pressure and in the other direction by a spring for movement between open and closed positions.

It is another object of the invention to provide a fail-safe safety valve having a gate type valve element held in one position by a fluid pressure operated piston and movable to another position by the force of a spring.

It is a still further object of the invention to provide a gate type valve which is spring biased toward a closed position and holdable in an open position by fluid pressure controllable responsive to either flow dependent or non-flow dependent variables.

It is another object of the invention to provide a fail-safe type pressure responsive actuating assembly for use with a gate valve.

It is still another object to provide a valve having easily manufactured components which are easily assembled to form the valve.

It is another object of the invention to provide a fluid pressure and manually operable valve including a valve assembly having an inner stem positioned within an outer stem comprising telescopically engaged upper and lower stem sections, the inner stem being threadedly engaged with the upper section of the outer stem whereby rotation of the upper section of the outer stem manually opens and closes the valve.

It is another object of the invention to provide a fluid and manually actuatable valve in which a portion of the closing force may be provided by line pressure acting on one effective area of the stem assembly while the valve may be manually opened against line pressure acting over a second substantially smaller effective area of the stem assembly thereby minimizing the load imposed on the stem threads during the manual opening of the valve.

It is a still further object of the invention to provide a fail-safe safety valve which may be manually opened and subsequently held in open position by fluid pressure.

It is a still further object of the invention to provide a valve having a stem assembly including inner and outer stems positioned through a cylinder base member secured on a valve body wherein metal to metal contact is provided between the stem assembly members, between the stem assembly and the base member and between the base member and the valve body to minimize fluid leakage from the valve in the event the valve is subjected to temperatures high enough to destroy the packing between the stem assembly members and the stem assembly and the base member.

Additional objects and advantages of the invention will be readily apparent from the reading of the following description of a device constructed in accordance with the invention, and reference to the accompanying drawings thereof, wherein.

Referring to the drawings, the valve 10 includes a valve body 11, a gate 12, and an actuating assembly 13 which raises and lowers the gate to open and close the valve, either manually or by fluid pressure. The body 11, which for purposes of this description shall be considered as of the structure below and including the upper flange 14, except the gate, is a commercially available valve body as described and illustrated at pages 3305-7 of the Composite Catalogue of Oil Field Equipment and Services, 1952–53 Edition, published by World Oil, Houston, Texas. The valve body includes the flanges 15 and 20 for connection of the valve into a flow line, not shown, and the bore 21 through which fluids flow through the valve.

The gate 12 comprises a pair of identical plates 22 each having an opening 23 and biased away from each other by the springs 24 positioned in the opposing holes 25 in the plates. The springs press the vertical outside plate faces 26 into engagement with the vertical valve seat surfaces 27 around the inlet and outlet sections of the bore 21 and thus maintain alignment of the plates as the gate is raised and lowered between the open and closed positions.

The gate 12 is raised and lowered by the T-nut 30 which is received in the T-shaped recesses 31 formed in the plates. The T-nut is raised and lowered within the valve body by the stem assembly 32 including the inner stem 33, and the outer stem 34 comprising the upper section 34a and the lower section 34b. The T-nut is threaded on and welded to the inner stem. The upper outer stem section 34a is formed by the sections 34c and 34d which are welded together to form an integral member. The opening of the gate is preferably controlled by fluid pressure applied within the cylinder 35 against the upper face of the piston 40 secured on the outer stem so that fluid pressure acting on the piston moves the entire stem assembly downwardly to move the gate from its open to its closed position. The gate is also manually movable between open and closed positions by the handle 41 which is rotatable to raise and lower the inner valve stem 33.

The inner stem 33 is slightly reduced in diameter along an intermediate section 33a for a purpose which is explained hereinafter. The upper end section 33b of the inner stem is externally threaded to permit operative engagement with the internally threaded nut portion 34e of the upper section of the outer stem so that rotation of the upper section of the outer stem by the handle 41 will raise and lower the inner stem which is held against rotation by the T-nut in the gate.

The lower section 34b of the outer stem is enlarged along a lower end section 34f providing an upwardly facing external annular flange 42 which is engageable with the internal downwardly facing annular flange 43 formed within the base member 44 of the cylinder assembly 35. An internal downwardly opening recess 45 is formed within the lower end section of the inner stem to receive the packing 50 to seal between the inner and outer stems above the T-nut. The packing is secured within the recess by the split lock ring 51 fitted within the lower end section of the outer stem. A lateral port 52 extends through the lower stem section 34b below the piston 40 to allow fluid communication between the chamber 53 within the cylinder below the piston and the small annular space 52a within the outer stem around the intermediate section of the inner stem.

The piston 40 is threaded on the lower section 34b of the outer stem so that the outer stem is raised and lowered with the piston. A ring seal 40a is positioned in the external annular recess 40b around the piston to seal with the inside wall of the cylinder. A split lock ring 54 is secured around the outer stem above and in engagement with the piston to limit the upward movement of the piston on the stem. An O-ring 55 is fitted between the outer stem and the piston below the lock ring to minimize fluid leakage along the connection between the stem and the piston. The upper end section of the lower section 34b of the outer stem is telescoped into the lower end section of the upper stem section 34a. A slip fit relationship is provided between the upper and lower sections of the outer stem so the upper section may be turned by the handle relative to the lower section. The O-ring 60 within the section 34a seals between the upper and lower outer stem sections. The outer stem is held against upward movement relative to the cylinder head 61 by the external annular flange 62 around the lower end section of the upper section of the outer stem. The thrust washers 63 are supported on the upper face of the flange 62 to engage the lower face of the internal annular flange 64 formed in the cylinder head so that the upper section of the outer stem may be more easily rotated when in the upper position shown. An O-ring 65 within the cylinder head seals between the cylinder head and the outer stem.

The handle 41 has a non-circular, aperture 66 for example an aperture which is of square configuration in which is received the portion 67 of the upper section 34a of the outer stem. The handle is held on the upper stem section by the nut 70 which is threaded on the stem end section above the handle. A grease fitting 71 is threaded into the upper end of the outer stem so that the grease may be injected through the flow passage 72 into the enlarged bore 73 within the outer stem around the upper end section of the inner stem to lubricate the threaded connection between the inner and outer stem.

Figure 4:
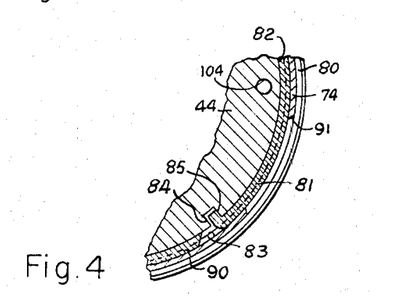

The cylinder head 61 is secured in a suitable manner as by welding, to the cylinder wall section 74 which is supported at the lower end within the upwardly opening external annular recess 75 formed in the annular flange 80 around the base member 44. The wall section is secured with the base member 44 by a flexible wire-like ring 81 which is received within the external annular recess 82 formed around the base member 44 and the internal annular recess 83 formed within the tubular wall section. Referring to FIGURE 4 the retainer 81 is a strip having a hooked end 84 which fits in the slot 85 formed in the base member opening into the annular recess 82. The retainer 81 is of sufficient length that it encircles the base member with the other end 90 of the retainer being closely adjacent to the hooked end 85. In securing the wall section on the base member the section is placed with its lower end resting within the recess 75 as in FIGURE 1 with the circumferential slot 91 aligned over the slot 84 in the base member to permit the hooked end 85 of the retainer to be inserted through the slot 91 into the slot 84. The wall section is then revolved counter-clockwise, with the relationships existing as in FIGURE 4, while the retainer is fed through the slot 91 into the recesses 81 and 82 between the wall section and the base member until the complete retainer has been fed into the recesses and the wall section is revolved to a position as in FIGURE 4 to hold both the hooked end 85 and the end 90 between the wall section and the base member.

The base member 44 is secured by the stud bolts 92 on the flange 14 of the valve body over a metal gasket 92a which seals between the base member and the valve body around the gate and stem assembly. The retainer ring 93 is threaded over the upwardly extending flange 94 on the base member to hold the packing 95 within the upwardly opening internal annular recess 100 to seal between the lower section 34b of the outer stem and the base member. The coil spring 101 is positioned within the chamber 53 below the piston around the stem assembly confined between the piston and the upper face of the base member to bias the piston in an upward direction.

The cylinder head 61 is provided with a port 102 into which a fluid flow line, not shown, is connected for supplying fluid pressure above the piston to displace the piston downwardly for opening the valve in response to fluid pressure. A relief valve 103 is connected through the cylinder head to reduce the pressure within the cylinder above the piston when such pressure exceeds a predetermined upper safe limit. The relief valve may be any suitable form of valve or may simply consist of a plate of a soft metal such as lead which will rupture when the pressure exceeds the predetermined limit. A bleed port 104 extends through the base 144 to expose the chamber 53 below the piston 40 to atmospheric pressure.

Figure 1:
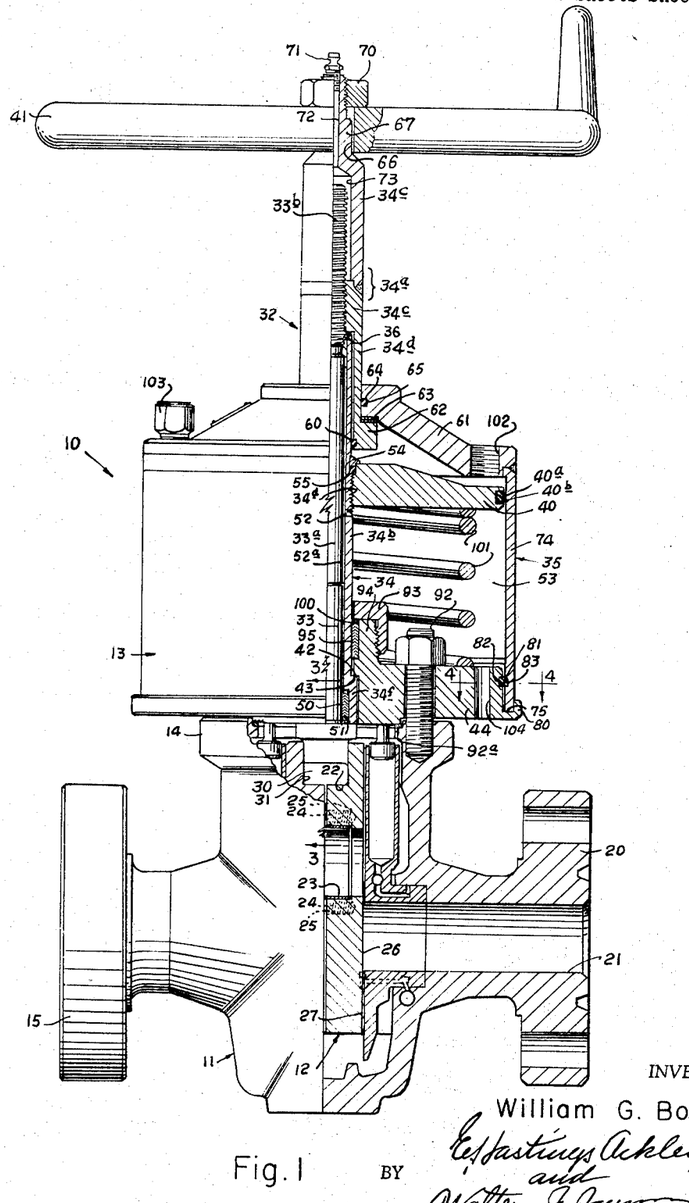
FIGURE 1 is a longitudinal view partly in section and partly in elevation illustrating a valve constructed in accordance with the invention.

The valve 10 is assembled in accordance with the following procedure. The packing 50 is positioned within the recess 45 in the lower section 34b of the outer stem and retained in place by engagement of the retainer ring 51 with the stem below the packing. The inner stem is threaded into the T-nut 30 and is inserted through the packing 50 and the lower outer stem section 34b. The gate plates 22 with the springs 24 in the holes 25 are placed together over the T-nut. The gate is then inserted into the valve body as illustrated in FIGURE 1 with the gate however resting in the downward position. The packing 95 is placed in the recess 100 of the base member with the retainer ring 93 being threaded on the flange 94 to hold the packing in position within the recess. The ring seal 92a is placed on the flange 14 of the valve body and the base member is then lowered over the inner and outer valve stems into position on the valve body and secured by the stud bolts 92. The spring 101 is compressed by a C-clamp (not shown), and placed around the stem on the base member after which the piston 40 with the ring seal 40a in position around the piston is threaded on the lower section of the outer stem while retaining the spring in the compressed condition. The ring seal 55 is placed around the outer stem on the piston followed by the retainer ring 54 which is snapped in place on the stem above the piston. The piston is then rotated relative to the stem to move it upwardly into tight engagement with the lock ring. The C-clamp is removed from the spring permitting it to expand into engagement with the upper face of the base member and the lower face of the piston to bias the piston and outer stem in an upward direction. The lower section of the outer stem is held against upward movement by the engagement of the shoulder 42 with the internal downwardly facing shoulder 43 of the base member. The O-ring 60 is placed within the upper section of the outer stem and the upper section is threaded downwardly over the inner stem and the lower section of the outer stem until the internal shoulder 36 of the outer stem upper section contacts the upper end of the lower section of the outer stem. The thrust washers 63 are placed over the upper section of the outer stem resting on the upper face of the flange 62 after which the O-ring 65 is placed within the flange 64 of the cylinder head 61 and the cylinder head with the wall section are lowered over the upper section 34a of the outer stem. The lower end of the wall section is positioned within the slot 75 around the base member 44. The wall section is locked to the base member 44 with the retainer 81 in the manner previously described. The handle 41 is disposed on the intermediate square portion 67 of the upper section 34a of the outer stem with the nut 70 being threaded on the stem above the handle to retain the handle in position. The grease fitting 71 is then threaded into the upper end of the outer stem above the handle so that grease may be injected through the fitting 71 into the bores 72 and 73 around the upper end section 33b of the inner stem to lubricate the threaded connection between the inner stem and the nut section 34e of the outer stem.

The valve is placed in operation by connecting it by means of its flanges 15 and 20 into the line, not shown, through which fluid flow control is desired. The fluid controlled by the valve will thus flow through the flow passage 21 of the valve. The valve is then connected by means of the port 102 to a controlled source of fluid pressure in response to which it is desired that the valve function. The port 102 may, for example, be connected with an Otis Surface Controlled Manifold as described and illustrated at page 3710 of the Composite Catalogue of Oil Field Equipment and Services, 1964-65 edition, published by World Oil, Houston, Tex. The surface control manifold may be connected through its pilot sensing line to one or several monitoring systems which detect flow dependent or non-flow dependent variables in response to which it is desired that the flow through the bore 21 be controlled. The surface control manifold maintains the required pressure within the chamber 53 above the piston 40 to hold the valve open until a condition is sensed which actuates the surface control manifold to reduce the pressure to allow the spring 101 to move the piston upwardly to close the valve.

With the valve 10 installed in the flow line and the control system, including the surface control manifold, connected with the valve as described, the valve is opened by raising the pressure within the chamber 53 above the piston 40 by means of the manifold. The increase in pressure causes the piston to be moved downwardly against the force of the spring 101 and the pressure in the flow passage 21 as applied against the valve stem assembly within the packing 95. The downward displacement of the piston moves the lower section 34b of the outer stem downwardly and its lower end engages the upper face of the T-nut to move the gate 12 downwardly within the valve body until the bore 23 through the gate is aligned with the bore 21 in the valve body to allow fluid flow through the valve. The threaded engagement between the lower end of the inner stem 33 and the T-nut causes the inner stem to be pulled downwardly as the valve is moved to open position and the threaded engagement between the upper section 34a of the outer stem and the threaded upper end section 34b of the inner stem draws the upper section of the outer stem and the handle 41 downwardly as the valve moves to open position. As long as the control fluid pressure within the cylinder above the piston is maintained at a sufficiently high value the valve will be held in the open position. While being operated by fluid pressure the position of the valve is readily detectable visually since the entire stem assembly including the handle are moved downwardly a substantial distance into the cylinder. The pressure of the control fluid is acting downwardly on the upper face of the piston 40 against the force of the spring 101 confined between the piston and the base member and the force resulting from the fluid pressure within the valve body acting on an area of the valve stem assembly equivalent to the area within the line of sealing engagement between the packing 95 and the outside surface of the lower section 34b of the outer valve stem. The very large area of the piston sealed by the ring seal 40a permits the valve to be held in open position by a relatively low operating control fluid pressure. For example, a control fluid pressure of 150 p.s.i. may hold the valve open against an operating pressure within the flow passage 21 of 5000 p.s.i.

When the control fluid pressure is lowered to a value which produces a downward force on the piston 40 less than the upward force produced by the compressed spring 101 and the flow line pressure the piston is moved upwardly to return the gate 12 to the closed position shown in FIGURE 1. As the piston moves upwardly the lower section 34b of the outer stem is lifted by the piston with the upper end of the stem section engaging the shoulder 36 within the upper section 34a of the stem to lift the inner stem 33. Upward movement of the inner stem lifts the T-nut causing the gate sections to be raised as the T-nut moves upwardly. The spring and flow line pressure cause the piston and valve stem assembly to be moved upwardly until the shoulder 42 around the lower outer valve stem section engages the shoulder 43 within the base member 44 thus limiting the valve assembly against further upward movement. The bore 23 of the gate is moved sufficiently out of alignment with the bore 21 that the valve is closed.

The chamber 53 below the piston is vented to the atmosphere through the bore 104 thus eliminating back pressure against the lower face of the piston as the piston is displaced downwardly and any suction effect below the piston as the piston moves upwardly. The lower stem section 34b is provided with the port 52 thus exposing the annulus 52a around the inner stem 33 to atmospheric pressure. The grease injected into the upper section of the outer stem around the inner stem is under atmospheric pressure through the grease fitting 71 and in the annulus 52a so there is little tendency for pressure to displace the grease from the area around the inner stem where it is intended to lubricate. If the pressure within the cylinder above the piston 40 exceeds a predetermined maximum value, the cylinder will be bled down through the valve 103, which, of course, may be either a valve which will rupture and allow complete exhaust of the control fluid from the cylinder or may be a valve which will bleed the control fluid down to a predetermined minimum pressure which may still be sufficiently high to retain the piston in the downward position to hold the valve gate 12 at open position.

If manual operation of the valve is desired, the handle 41 is rotated to turn the upper section 34a of the outer stem which is rotatably positioned through the cylinder head 61 and held against upward movement by the thrust washers 63. The telescoping slip fit between the lower section 34b of the outer stem and the upper section allows the upper section to revolve relative to the lower section of the outer stem. As the upper section of the outer stem revolves, the inner stem 33 is held against rotation by the T-nut 30 in the non-rotating gate 12 and is moved downwardly due to the threaded connection between the nut section 34c of the outer stem and the upper threaded section 33b of the inner stem. Thus, as the upper section of the outer stem rotates the inner stem 33 is moved downwardly until the gate 12 is at its lower end position to align the bore 23 through the gate with the bore 21 of the valve body so that fluid may flow through the valve. The inner stem moves downwardly through the packing 50 during the manual opening of the valve while the outer stem remains in the upper position of FIGURE 1. The valve may be manually returned to the closed position by rotating the handle 41 in the opposite direction causing the nut section 34c of the rotatable upper section of the outer stem to operatively engage and lift the inner stem to return the gate to the closed position of FIGURE 1. During complete manual operation of the valve the position of the gate and thus a determination of whether the valve is open or closed cannot be made by visual observation as the outer stem and handle do not move up and down. This, of course, is to be contrasted with the situation when the valve has been opened by fluid pressure since the entire valve stem and handle are then depressed downwardly and thus it may be visually determined as to whether or not the valve is in open condition if opened by fluid pressure.

The valve may be manually moved to the open position and then held in such position by increasing the control fluid pressure within the cylinder above the piston. To carry out such a procedure the valve is manually moved by rotating the handle 41 as described above to lower the inner stem and the gate to the open position. At this position, after manual operation, the piston 40 along with the outer stem and handle remain in the upper position. The pressure through the port 102 is now raised to a sufficient value to displace the piston 40 downwardly against the force of the spring 101 and the flow line pressure across the valve stem within the packing 95. As the piston is displaced downwardly the lower section 34b of the outer stem is moved downwardly away from the upper section 34a of the outer stem until the lower end of the lower section engages the upper face of the T-nut 30 which is downward due to the open position of the gate. At this intermediate stage, the gate, the T-nut, the inner stem 33, and the lower section 34b of the outer stem are all in a downward position with the upper section 34a of the outer stem remaining in the upper position since the inner stem had been threaded downwardly through the nut section of the outer stem during the manual opening. In this condition the valve gate cannot be returned to the upper closed position simply by relaxation of the control fluid pressure since the upper section 34a of the outer stem is still in the upper end position and its threaded engagement with the inner stem will not permit the inner stem to move upwardly to allow the valve to move to the closed position unless the gate is lifted manually. Therefore, the upper end section of the outer stem must be manually lowered to permit the valve to be returned upwardly by the spring upon release of the control fluid pressure. The handle 41 is turned to rotate the upper section of the outer stem to thread the upper section downwardly over the inner stem until the upper section of the outer stem is telescoped over the lower section of the outer stem with the upper end of the lower section engaging the internal shoulder 36 within the upper section. Now, the valve is held in open position by control fluid pressure and all elements of the valve stem assembly including the handle and the upper section of the outer stem are in the downward position so that they have room to move to their normal upper position to close the valve upon relaxation of the control fluid pressure.

It will now be seen that there has been illustrated and described a new and improved flow control device.

It will be seen that the valve described and illustrated is remotely controllable by fluid pressure which may be operable responsive to a predetermined condition in either flow dependent or non-flow dependent variables.

It will be apparent that the valve includes a piston against which a controlled fluid pressure is applied to hold the valve in open position until a predetermined condition in a monitored variable reduces the control fluid pressure to permit the valve to be returned to a closed position.

It will be further seen that the valve is actuated in one direction by a pressure responsive operator piston and in the other direction by a spring and the pressure of the fluid within the conduit controlled by the valve.

It will be further seen that the valve includes a gate which is longitudinally movable between open and closed positions by a stem assembly actuated by a pressure responsive piston.

It will be additionally seen that the valve includes means for manually moving it between open and closed positions.

It will be further seen that the structure of the valve permits it to be opened manually and held in such open position by fluid pressure applied to the operator piston on the valve stem.

It will additionally be seen that the pressure chamber of the valve is protected against an excessive pressure by a relief valve.

It will be further seen that the valve is a fail-safe type which is returnable to a closed position automatically upon a reduction to a predetermined level of the pressure of the control fluid employed to hold the valve open.

It will also be seen that the cylindrical pressure chamber of the valve is formed within a cylinder including a base member which is readily securable in a sealed relationship on the valve body.

It will also be seen that the gate of the valve is operatively connected with a stem assembly which includes an inner stem having a threaded upper end section and an outer stem comprising a lower stem section and an upper outer stem section telescopically fitted in sliding relationship over the upper end of the lower section, the upper section being threadedly engaged with the threaded upper end section of the inner stem.

It will also be seen that the stem assembly of the valve is moved in one direction by a pressure responsive piston engaged on the lower section of the outer stem and is moved in the opposite direction by line pressure and a spring engaged with the piston, while the inner stem is movable by rotation of the upper section of the outer stem to mechanically move the valve between open and closed positions.

It will be further seen that the upper outer stem section of the valve is movable in sealed relationship through the head member of the cylinder and held against upward movement by thrust means engaged between the inner face of the cylinder head member and the upper face of an outwardly extending annular flange around the lower end section of the upper outer stem section.

It will additionally be seen that the base member of the cylinder of the valve supports a packing to seal between the base member and the lower outer stem section permitting such section to slide in sealed relationship through the base member and a packing carried by the lower outer stem section seals between such section and the inner stem permitting the inner stem to move in sealed relationship within the lower outer stem section.

Figure 2:
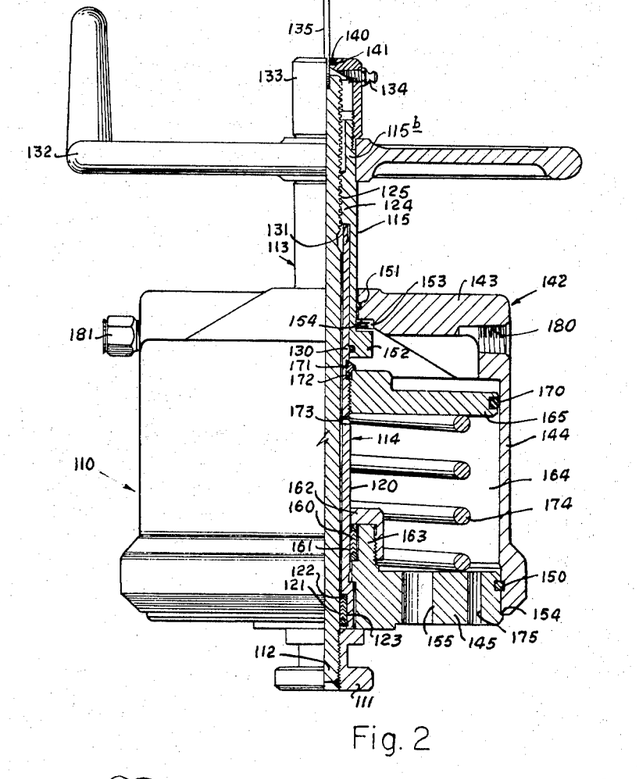
FIGURE 2 is a longitudinal view partly in section and partly in elevation illustrating a modified form of valve actuating assembly which may be employed with the valve body and gate of FIGURE 1.
Figure 3:
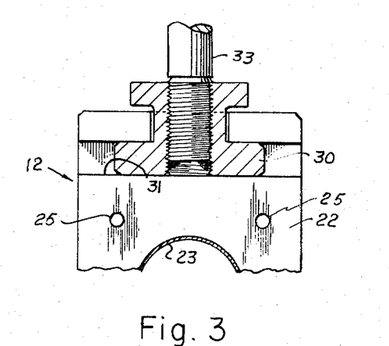
FIGURE 3 is a fragmentary view partly in section and partly in elevation along the line 3—3 of FIGURE 1 showing the lower end of the valve stem assembly and the upper end of the valve gate; and, FIGURE 4 is a fragmentary view in section along the line 4—4 of FIGURE 1.

An alternative embodiment of a valve actuating assembly 110 useful with the valve body and gate of FIGURE 1 is illustrated in FIGURE 2. The T-nut 111, receivable in the recesses 31 of the gate plates 22, is threaded and welded on the lower end of the inner stem 112 of the stem assembly 113, which also includes the outer stem 114 having an upper section 115 and a lower section 120. The packing 121 in the recess 122 seals between the inner stem and the lower end section 123 of the outer stem. The upper stem section 115 has the internally threaded nut section 124 which is operatively engaged on the upper threaded section 125 of the inner stem so that rotation of the stem section 115 will effect longitudinal movement of the inner stem to raise and lower the T-nut for manually opening and closing the valve. The upper and lower sections of the outer stem are telescopically fitted together in a sliding relationship with the ring seal 130 being carried within the upper section to seal around the lower section. Upward movement of the lower section of the outer stem into the upper section is limited by the engagement of the upper end of the lower section with the internal annular shoulder 131 within the upper section.

A handle 132 is secured on the square section 115b of the upper stem section 115 by the cap 133 which is provided with a grease fitting 134 through which grease may be injected into the cap around the upper threaded end section of the inner stem to lubricate the threaded connection between the inner and outer stems. A marker bar 135 is connected to the upper end of the inner stem extending through the aperture 140 in the cap and sealed by the ring seal 141 carried by the cap so that the position of the upper end of the inner stem relative to the cap 133 may be observed.

The cylinder 142 comprising the integrally formed head member 143 and the side wall member 144 is secured on the base member 145 by the retainer 150. The upper outer stem section 115 fits in sliding relationship through the head member 143 with a seal around the stem being formed by the ring seal 151. Upward movement of the outer stem section 115 is limited by the external annular flange 152 which engages the roller type thrust bearing 153 which is press fitted into the downwardly and inwardly opening recess 154 within the head member.

The lower end of the wall section 144 engages the upwardly facing external annular flange 154 around the periphery of the base member to properly align the cylinder 142 on the base member and hold it against downward movement. The wall section 144 and the base member 145 are provided with identical slots and recesses, not shown, for insertion and engagement of the retainer 150 as illustrated in FIGURE 4 with respect to the form of the invention shown in FIGURE 1. The base member is provided with the bolt holes 155 for securing the assembly 110 to the valve body.

The packing 160 within the recess 161 of the base member is held against upward movement by the retainer ring cap 162 threaded on the upwardly extending flange 163 formed on the base member. The packing 160 seals between the base member around the outer stem.

The piston 165 having peripheral ring seal 170 to seal with the inner wall of the cylinder is threaded on the lower section 120 of the outer stem and held against rotational movement on the stem by the split lock ring 171. A ring seal 172 is fitted around the outer stem lower section within the piston below the lock ring to prevent fluid leakage from above the piston between the piston and the outer stem. A bleed port 173 extends through the lower section 120 of the outer stem below the piston to provide fluid communication through the stem between the cylinder and the annular space around the reduced central section 112a of the inner stem. The spring 174 is confined between the upper face of the base member 145 and the lower face of the piston to bias the piston in an upward direction. The chamber 164 below the piston is vented to the atmosphere through the bleed port 175. A control fluid line is securable into the cylinder through the internally threaded lateral port 180 to permit the connection of a source of fluid pressure such as the surface control manifold referred to hereinabove. The relief valve 181 is connected into the cylinder to release the pressure within the cylinder above the piston when it exceeds a predetermined maximum safe value.

The valve 110 is assembled and operated by following steps identical to those of previously discussed above in connection with the valve 10 illustrated in FIGURE 1. When the valve is manually operated the indicator 135 provides a visual showing of the longitudinal position of the inner stem and thus indicates whether the valve is open or closed.

It will be seen that there has been additionally described and illustrated in FIGURE 2 a further form of a new and improved fail-safe type pressure actuatable gate valve.

It will be seen that the valve includes a cap member having a grease fitting threaded over the upper end of the upper section of the outer stem.

It will be additionally seen that the upper section of the outer stem is a single unitary or integral structure.

It will additionally be seen that a roller type thrust bearing is positioned between the upper section of the outer stem and the cylinder head to facilitate rotation of the upper stem outer section relative to the cylinder head when such section is in the upper position.

It will also be seen that the cylinder of the valve includes integrally formed head and wall sections.

While the embodiments of the valve illustrated and described are held in the open position by control fluid pressure and are returnable to the closed position upon the reduction of such pressure to a predetermined level it will be recognized that the valve may readily be modified to be held by control fluid pressure in the closed position and returnable to an open position upon reduction of the control fluid pressure. Such a modified form of the valve is readily constructed by using a gate having a flow passage therethrough in the lower half of the gate rather than the upper half as illustrated in FIGURE 1. Such a modified form of valve would therefore be open with the elements of the valve positioned as shown in FIGURE 1 and upon the application of control fluid pressure into the cylinder above the piston, the piston would be displaced downwardly to hold the gate in a closed position so long as the control fluid pressure was imposed on the upper face of the piston. Upon relaxation of the control fluid pressure the spring would move the piston back upwardly to lift the gate and move the valve to the open position.

It will now be apparent that in a further embodiment of the valve of the invention the valve is held in a closed position by a controlled fluid pressure and is returnable to an open position upon reduction of such fluid pressure.

The valve actuating assemblies illustrated in both FIGURES 1 and 2 are not limited to use with only the valve body shown in FIGURE 1. Other forms of valve bodies and gates may readily be adapted to use with the actuating assemblies shown herein.

It will therefore be apparent that there has been described and illustrated a new and improved fail-safe gate valve actuating assembly.

In both embodiments of the valve illustrated and described the area of the stem assembly within the line of sealing engagement with the lower outer stem section of the packing between the base member and the lower outer stem section is substantially greater than the area of the inner stem within the line of sealing engagement with the inner stem of the packing between the lower stem section and the inner stem. Each of these areas is exposed to line pressure from within the bore 21 of the valve body. The manual opening of the valve, therefore, is opposed by line pressure acting on the smaller effective area of the inner stem so that the load on the threaded connection between the upper section of the outer stem and the inner stem is minimized during the manual closing of the valve. The larger effective area within the line of sealing engagement around the lower outer stem section however, provides a greater area over which the line pressure is effective to aid in closing the valve when the control fluid pressure drops. Also, this larger effective sealed area around the outer stem requires a greater force to close the valve by fluid pressure on the piston than is required to manually close the valve.

In both embodiments of the valve the metal to metal contacts with the stem assembly and between the base member and the valve body enhance the sealing capabilities of the valve under disaster conditions such as fire. Referring specifically to FIGURE 1 the shoulders 42 and 43 along with the lower end surface of the lower outer stem section and the upper surface of the T-nut which engages the lower end surface of the lower stem section are provided with seat type finishes so that when the surfaces engage each other there will be sealing contact between them. In addition, the gasket 92a is a metal gasket sealing between the base member 44 and the body of the valve. If the valve is subjected to very high temperatures, as in a fire, which destroys the packings 50 and 95 the above discussed seat surfaces minimize, if not entirely prevent, leakage through the base member and along the inner and outer stems. The contact between the shoulder 42 and 43 will prevent leakage between the lower section of the outer stem and the base member while the contact between the T-nut and the lower end of the lower outer stem section will prevent leakage between the outer stem and the inner stem. The metal packing 92a is unaffected by the higher temperatures which might destroy the above mentioned packing. The prevention against leakage both prevents loss of products from the well and also prevents providing additional fuel to a fire burning around the wellhead area.

It will be seen that the novel construction of the stem assembly provides a relatively small effective area acted upon by line pressure against which the valve is manually opened while also providing a substantially larger effective area acted upon by line pressure facilitating the closing of the valve by such line pressure. It will also be seen that the inner stem moves downwardly within the outer stem in manually closing the valve and thus does not have to overcome the force of the piston biasing spring. It will thus be apparent that the minimum resistance to the manual closing of the valve reduces the load imposed upon the threaded connection between the inner stem and the upper section of the outer stem.

It will also be seen that valve leakage in the event of destruction of the packing between the inner and outer stem and the base member by such causes as fires is minimized by the metal to metal contact between the lower end of the lower outer stem section and the T-nut and between the lower outer stem section and the base member.

It will be further seen that the sealed relationship between the base member and the valve body is substantially unaffected by excessive temperatures.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A valve comprising: body means having a flow passage extending therethrough; valve means in said body means movable relative to said flow passage for controlling fluid flow therethrough; first stem means having means securing it to said valve means; second stem means operatively associated with said first stem means and having a first section operatively connected with said first stem means and a second section movable longitudinally with respect to said first section and said first stem means, and engageable with said means securing said first stem means to said valve means; and stem actuating means connected with said second section stem means for actuating both said stem means for moving said valve means between open and closed positions, said first stem means being operable to move said valve means independently of movement of said second stem means.

2. A valve comprising: a body having a flow passage extending therethrough; a gate within said body having a port movable into and out of alignment with said flow passage through said body for opening and closing said valve; an inner stem having means for securing it at one end to said gate for moving said gate between open and closed positions; an outer stem operatively secured around and concentric with said inner stem, said inner and outer stems being rotationally and longitudinally movable relative to each other; said outer stem having means engaging said means for securing said inner stem at one end to said gate, whereby movement of said outer stem moves said inner stem and said gate secured thereto, a cylinder having a base member and a head member secured around said outer stem and in sealed relationship thereto, said base member of said cylinder being connected with said valve body; said outer stem beng slidable relative to and through said base and said head members of said cylinder; a piston secured on said outer stem within said cylinder and having a piston ring sealing the edge of said piston with the inside wall of said cylinder whereby fluid pressure may be applied in said cylinder on one side of said piston to displace said piston within said cylinder for moving both said inner and said outer stems in one direction; a resilient member confined within said cylinder between said piston and said base member for biasing said piston and said outer stem in the other direction; and apparatus for manually rotating a portion of said outer stem to move said inner stem longitudinally independently of longitudinal movement of said outer stem for moving said valve gate for manually opening and closing said valve.

3. A valve according to claim 2 including packing between the inner and outer stems forming a line of sealing engagement with the inner stem enclosing an effective area less than the effective area enclosed within a line of sealing engagement between said outer stem and a packing within said base member around said outer stem; said outer stem having a lower end seat surface operatively engageable with said gate for reducing leakage from said valve body between said inner and outer stems and seat surfaces between said outer stem and said base member providing metal to metal contact to minimize leakage through said base member around said outer stem from said valve body around said outer stem.

4. A valve comprising: a valve body having a flow passage therethrough; a gate movable in said valve body relative to said flow passages for opening and closing said valve; a stem assembly secured at one end to said gate for moving said gate between open and closed positions; said stem assembly including an inner stem connected with said gate and an outer stem operatively engaged around and concentric with said inner stem, said outer stem having lower and upper sections telescopically engaged with each other, said upper section being threadedly connected with said inner stem; a cylinder having a base member and a head member secured in sealed relationship around said outer stem, said base member being connected on said body of said valve and being positioned around and sealed with said lower section of said outer stem; said head member being positioned in sealed relationship around said upper section of said outer stem; a piston engaged on said lower section of said outer stem within said cylinder whereby fluid pressure applied in said cylinder against said piston displaces said piston and stems in a first direction; and a resilient member within said cylinder confined between said piston and said base member for biasing said piston and said stems in a second direction opposite from said first direction.

5. A valve comprising: a valve body having a flow passage extending therethrough; a gate having a port therethrough adapted to be moved into and out of alignment with said flow passage through said body for opening and closing said valve; a hollow cylinder having a base member and a head member secured by said base member on said valve body; a stem assembly operatively connected through and in sliding relationship with said cylinder and secured at one end to said gate for moving said gate between open and closed positions; said stem assembly having an inner stem connected with said gate and an outer gate stem positioned around and concentric with said inner stem, said outer stem comprising lower and upper sections telescopically engaged with each other, said lower section extending in sealed relationship through said base member, said upper section extending in sealed relationship through said head member and being threaded on said inner stem whereby rotational motion of said upper section effects longitudinal movement of said inner stem to move said gate between open and closed positions; a piston secured around said lower section and having a seal around the outer periphery thereof engaged with the inner wall of said cylinder whereby fluid pressure applied on one side of said piston within said cylinder displaces said piston to move said stems and said gate in a first direction; and a spring within said cylinder around said stems confined between said base member and said piston for moving said piston in a second direction opposite of said first direction.

6. A valve comprising: a valve body having a flow passage extending therethrough; a gate movable within said valve body for opening and closing said valve; a cylinder having a base member and a head member secured on said valve body; an inner stem connected at one end to said gate and extending through said cylinder, the other end section of said inner stem being provided with external threads; a lower outer stem section positioned around and concentric with said inner stem and secured in sliding relationship through said base member on said cylinder; an upper outer stem section telescopically engaged over the upper end of said lower outer stem section and slidably positioned in sealed relationship through said head member of said cylinder, said upper outer stem section having an internally threaded nut section engaged on said threads of said inner stem whereby rotation of said upper outer stem section effects longitudinal movement of said inner stem relative to said outer stem to move said gate between open and closed positions; a piston secured around said lower outer stem section within and slidable relative to said cylinder whereby fluid pressure may be applied in said cylinder on one side of said piston to move said piston and said stems in a first direction; a spring within said cylinder around said stems confined between said piston and said base member for biasing said piston in a second direction; and means for connecting a control fluid line into said cylinder for applying fluid pressure to said piston on the opposite side of said piston from said spring.

7. A valve comprising: a valve body having a flow passage extending therethrough; a gate movably positioned within said valve body and having a port therethrough movable into and out of alignment with said flow passage for opening and closing said valve; a cylinder base member secured on said valve body, said base member having an external annular upwardly opening recess; a cylindrical wall section fitted over said base member, the lower end of said wall section being received within said recess around said base member; said base member having a bore therethrough and being provided with an internal annular downwardly facing shoulder around said bore and an upwardly and inwardly opening packing recess around said bore above said shoulder; a cylinder head member secured on said wall section, said head member having a longitudinally extending flow passage for connecting a control fluid conduit into said head member having a central bore therethrough; a lower outer stem section positioned through said base member and said head member; said stem section having an external annular shoulder engageable with said internal annular shoulder within said base member to limit upward movement of said stem section relative to said base member and an internal downwardly opening packing recess; an annular packing within said packing recess of said base member around said lower outer stem section; a retainer ring engaged on said base member for holding said packing against upward movement from said packing recess; an upper outer stem section slidably positioned through said bore of said head member telescopically engaged over the upper end section of said lower outer stem section; said upper outer stem section comprising an upper and a lower section, said lower section having an outwardly extending flange below said head member; a thrust washer on said outwardly extending flange adapted to engage said head member for holding said upper outer stem section against upward movement and permitting rotational movement of said stem section relative to said head member; said upper outer stem section having an internally threaded nut section and a downwardly facing internal shoulder engageable with the upper end of said lower outer stem section to limit upward movement of said lower outer stem section within said upper outer stem section; a piston secured around said lower outer stem section between said base member and said head member; a ring seal secured around said piston to seal with the inside wall of said cylinder wall section; a spring positioned around said lower outer stem section confined between said base member and said piston for biasing said piston away from said base member; an inner stem positioned through and in concentric relationship with said lower and upper outer stem sections, the lower end of said inner stem being engaged with said gate for moving said gate between open and closed positions, the upper end section of said inner stem having threads engaged with the internally threaded section of said upper outer stem section whereby rotation of said upper outer stem section around said inner stem effects longitudinal movement of said inner stem to move said gate between open and closed positions; a packing within said recess of said lower outer stem section around said inner stem to seal between said outer stem and said inner stem; a relief valve engaged in said head member; said base member having bleed port extending therethrough; and means engaged with said upper outer stem section for manually rotating said section to effect longitudinal movement of said inner stem.

8. A valve according to claim 7 wherein the effective area within the line of sealing engagement between said annular packing around said lower outer stem section and said lower outer stem section is greater than the effective area within the line of sealing engagement between said packing within said lower outer stem section with said inner stem.

9. A valve according to claim 8 wherein said external annular shoulder on said lower outer stem section and said internal annular shoulder within said base member are seat surfaces, and the lower end surface of said lower outer stem section is a seat surface.

10. A valve comprising: a valve body having a flow passage extending therethrough; a gate movable in said valve body having a port therethrough for movement into and out of alignment with said flow passage for opening and closing said valve; a cylinder base member secured in sealed relationship on said valve body, said base member having an external upwardly facing annular peripheral flange; a unitary cylinder head and wall section member secured on said base member, the lower end of said wall section being supported on said external annular shoulder around said base member; said head and wall section member having a port for the connection of a control fluid supply line; said head having a central bore; said base member having a central bore along an axis coincident with the axis of the bore through said head member, said base member having an internal annular downwardly facing shoulder around said bore and an upwardly extending flange around said bore having an upwardly opening packing recess around said bore above said shoulder; a lower outer stem section positioned through said base member and said head portion of said head and cylinder wall section member, said outer stem section having an external upwardly facing annular shoulder engageable with said shoulder around said bore of said base member to limit the upward movement of said stem section relative to said base member; an upper outer stem section positioned in slidable telescopic relationship over the upper end of said lower outer stem section, said upper outer stem section having an outwardly extending lower annular flange engageable with said head to limit the upward movement of said section relative to said head; means providing a seal between said head and said upper outer stem section; a thrust bearing secured within said head member around said bore for engagement with said outwardly extending flange on said upper outer stem section to hold said section against upward movement and permit said section to revolve relative to said head when in an upper position relative to said head; means providing a seal between said upper stem section and said lower outer stem section; packing means positioned within said packing recess around said bore through said base member; a retainer ring secured on said base member over said upwardly extending flange and packing means to hold said packing means against upward movement; an inner stem in sealed relationship through said upper and lower sections of said outer stem and threadedly engaged with said upper section of said outer stem whereby rotation of said upper section effects longitudinal movement of said inner stem, the lower end of said inner stem being operatively engaged with said gate in said valve body whereby longitudinal movement of said inner stem effects opening and closing of said valve; a cap member threaded over the upper end of said upper section of said outer stem; a grease fitting through said cap member; a handle on said upper section of said outer stem below said cap member for rotating said upper section of said outer stem below said cap member for rotating said upper section of said outer stem to move said inner stem longitudinally within said outer stem; a piston secured on said lower section of said outer stem between said base member and said head member of said cylinder whereby fluid pressure within said cylinder above said piston displaces said piston downwardly to move said outer stem and said inner stem downwardly for actuating said gate; a peripheral seal ring around said piston for sealing between said piston and the inside wall of said wall section of said cylinder; said base member having a bleed port; a spring around said outer stem within said cylinder confined between said piston and said base member for biasing said piston away from said base member to move said outer stem and said inner stem in the other direction in the absence of control fluid pressure above said piston; said lower section of said outer stem having a bleed port extending therethrough below said piston; and a relief valve connected into said head member above said piston.

11. A valve in accordance mith claim 10 wherein a metal packing is positioned between said cylinder base and said valve body; the line of sealing engagement between said packing means around said bore through said base member with said lower outer stem section defines an effective area greater than the effective area within the line of sealing engagement between said lower section of said outer stem and said inner stem.

12. A valve according to claim 10 including: a T-nut threaded on the lower end of said inner stem for engaging said gate.

13. A valve according to claim 10 including: a ring seal on said piston around said lower outer stem section; a split lock ring engaged on said lower outer stem section against the upper face of said piston to hold said piston against upward movement on said stem section; said inner stem having a central section of reduced diameter providing an annular space along said central section within said lower outer stem section; and said lower outer stem section having a bleed port extending therethrough below said piston to provided fluid communication between said cylinder below said piston and said annular space around said inner stem.

14. A valve according to claim 13 including in addition thereto: said base member having a peripheral lock ring recess and a slot opening into said recess above said upwardly facing external annular shoulder; said wall section of said head and wall section member having an internal annular lock ring recess spaced upwardly from the lower end of said wall section to align with said external annular lock ring recess on said base member when said wall section is positioned on said base member with the lower end of said wall section on said upwardly facing external annular flange; said wall section being further provided with an elongated slot extending circumferentially along said wall section opening into said internal annular lock ring recess within said wall section; and a split lock ring engaged within said lock ring recess of said base member and said wall section to hold said base member and said wall section together, one end of said lock ring having a hooked portion received in said slot in said base member opening into said lock ring recess of said base member.

15. A valve comprising: a valve body having a fluid flow passage; a valve gate movable in said body relative to said flow passage to open and close said flow passage; a cylinder having a base member secured on said valve body forming a pressure chamber; a valve stem assembly extending in sealed slidable relationship through said cylinder; said stem assembly including an inner stem connected at the lower end thereof with said gate, and an outer stem having separate lower and upper sections concentrically positioned around said inner stem, said upper section being threadedly engaged with said inner stem whereby rotation of said upper section relative to said inner stem moves said inner stem within said outer stem; packing between said lower section and said inner stem above said gate; packing around said lower section within said base member; the line of sealing engagement between said packing around said inner stem defining an effective area less than the effective area enclosed by the line of sealing engagement between said lower section of said outer stem and said packing around said outer stem; the lower section of said outer stem having a seat surface operatively engageable with a seat surface associated with said gate for forming a metal to metal seal between said inner stem and said outer stem when said inner stem is in an upper position relative to said outer stem; said base member and said lower section of said outer stem having engageable seat surfaces forming a metal to metal seal between said outer stem and said base member when said outer stem is in an upper position; an annular piston engaged on said lower section of said outer stem within said pressure chamber; said cylinder being provided with a port to permit applying fluid pressure into said chamber to displace said piston toward said valve body; and resilient means between said piston and said base member for biasing said piston away from said base member.

16. An actuating assembly for a gate valve comprising: a stem assembly including a first stem member and a second stem member, said first stem member having means for operatively connecting it at one end to a gate within a valve body for moving said gate between open and closed positions, said second stem member being movable with respect to said first stem member and operatively associated with said first stem member and said means for connecting said first stem member to said gate; a cylinder secured around said stem assembly adapted to be mounted on the body of said valve and permit said stem members to reciprocate in sliding relationship through said cylinder; a piston secured on said second stem member of said stem assembly and movable in sealed relationship within said cylinder whereby fluid pressure applied in said cylinder displaces said piston in a first direction for moving said second stem member and the valve gate in said direction; and resilient means within said cylinder confined between said piston in one end of said cylinder for biasing said piston in a second direction opposite to said first direction, said first stem member being operable to move said valve gate between open and closed positions independently of movement of said valve gate by said second stem member, said first stem member being concentrically positioned within said second stem member and said second stem member having a lower section telescopically engaged within an upper section threadedly connected with said first stem member, the lower end of said second stem member being operatively engageable with the lower end of the first stem member.

17. A valve actuating assembly for a gate valve comprising: a stem assembly adapted to be connected at one end to a gate within a valve body for moving said gate between open and closed positions; a cylinder secured around said stem assembly adapted to be mounted on the body of said valve and permit said stem to reciprocate in sliding relationship through said cylinder; a piston secured on said stem assembly and movable in sealed relationship within said cylinder whereby fluid pressure applied in said cylinder displaces said piston in a first direction for moving said stem in said direction; and resilient means within said cylinder confined between said piston and one end of said cylinder for biasing said piston in a second direction opposite to said first direction, said stem assembly comprising an inner stem concentrically positioned within an outer stem having a lower section telescopically engaged with an upper section threadedly associated with said inner stem, said outer stem section having a seat surface on the lower end thereof operatively engageable with a gate when said assembly is connected on a gate valve for minimizing leakage from said gate valve body between said inner stem and said lower outer stem section and seat surfaces between said lower outer stem section and said cylinder providing metal to metal contact to minimize leakage from said valve body between said lower outer stem section and said cylinder.

References Cited
UNITED STATES PATENTS

| | | | |
|---|---|---|---|
| 1,039,340 | 9/1912 | Weitzel | 251—326 |
| 2,622,617 | 12/1952 | Sederquist | 251—14 |
| 2,733,041 | 1/1956 | Crookston | 251—14 |
| 3,029,060 | 4/1962 | Anderson | 251—14 |

M. CARY NELSON, *Primary Examiner.*

A. ROSENTHAL, *Assistant Examiner.*